_____

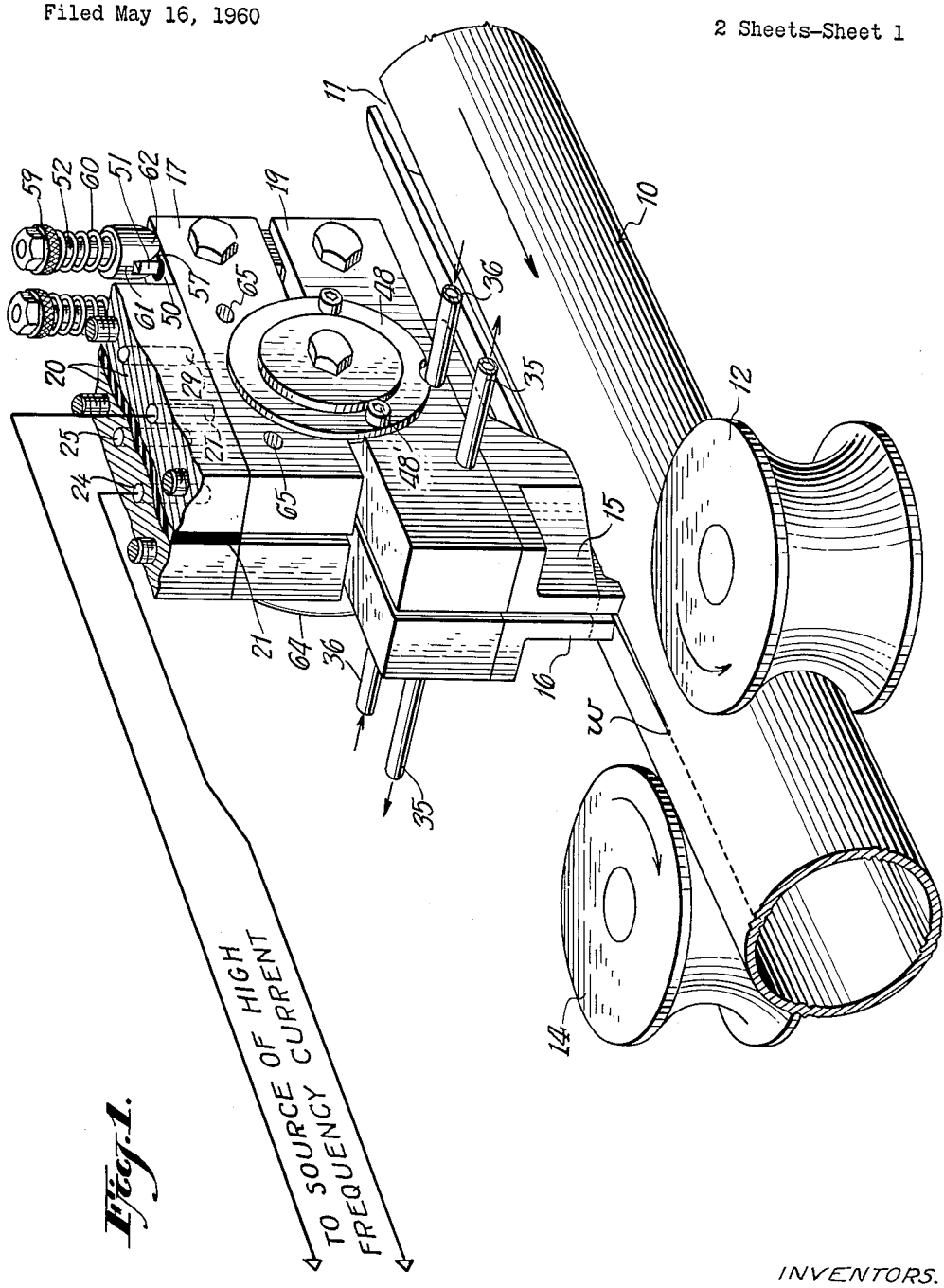

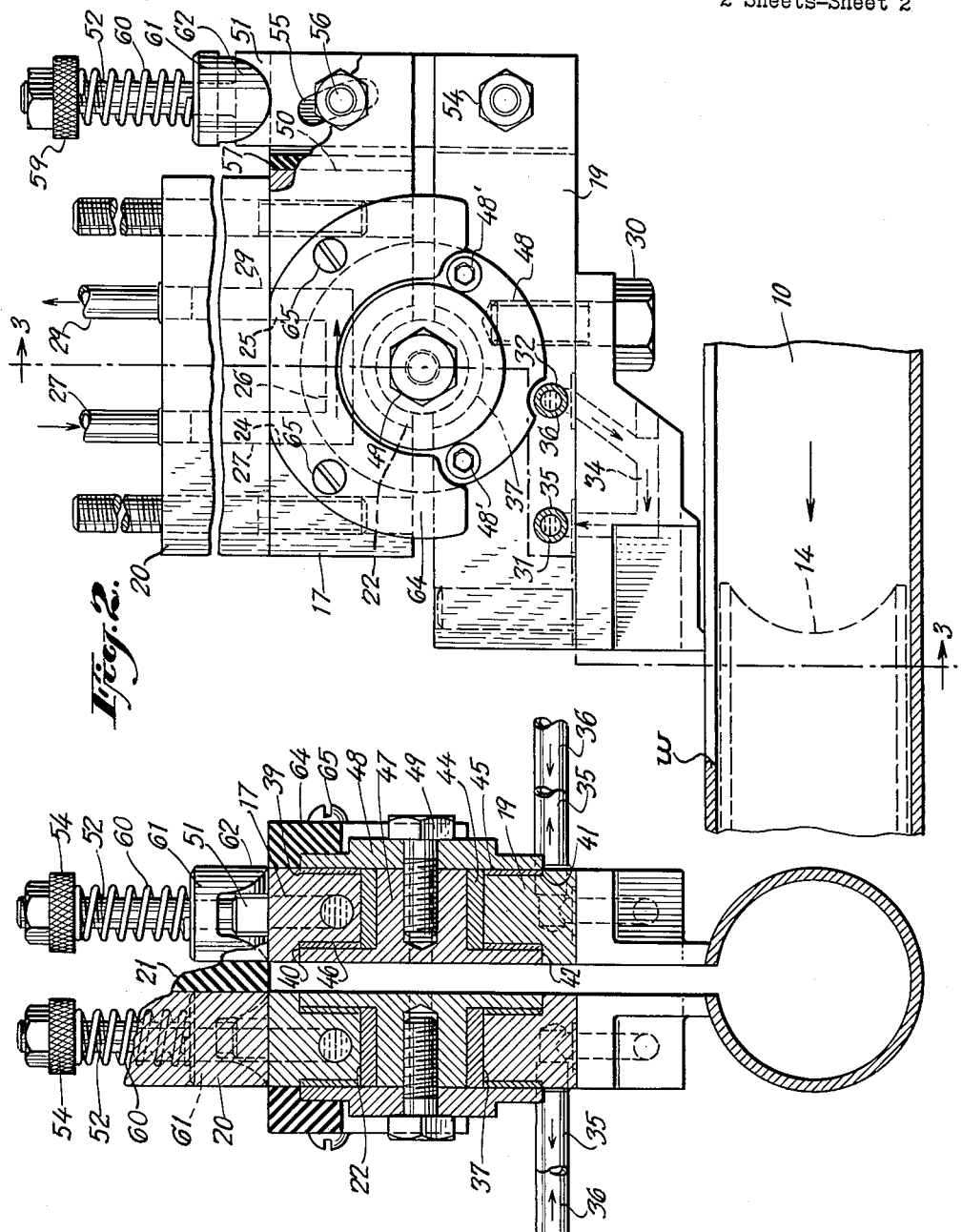

United States Patent Office 3,056,882
Patented Oct. 2, 1962

_____

3,056,882
MOUNTING DEVICE
Jack Morris, Monsey, Harry Zausner, Bronx, and Charles Beaumont, Pleasantville, N.Y., assignors, by mesne assignments, to American Machine & Foundry Company, New York, N.Y., a corporation of New Jersey
Filed May 16, 1960, Ser. No. 29,267
14 Claims. (Cl. 219—65)

This invention relates to apparatus for supporting electrical contacts, and, more particularly, to such apparatus adapted to supply high current loads at radio frequency to contacts which engage a moving work piece.

The construction of effective devices of the class described presents a very considerable problem, since in certain applications it is necessary to supply radio frequency current of the order of 1500 to 2000 amperes, or more, through contacts, to a moving work piece. For example, one of the applications of such devices is in the continuous welding of the opposed edges of a V-shaped longitudinal gap in a tubular strip of sheet metal by the application of high frequency current to the surface of the tube adjacent the gap, to form a welded tube thereof. But in the shaping of the sheet metal into the tubing, it is not possible to form the same so as to be able to maintain the surface of the metal adjacent the gap in the same plane as the metal passes by the contacts. This is due to variations in the smoothness of the metal surface as well as to a certain range of tolerances inherent in the forming apparatus. Thus, it will be appreciated that if the contacts leave the surface of the metal during the continuous welding operation an arc will be formed therebetween which not only damages the contacts, thus requiring frequent repair or replacement, but also may damage the metal being welded to the extent that the damaged portion must be cut out of the length of tubing or the tube discarded altogether. Additionally, due to the fact that current at radio frequency is being supplied, and due to the magnitude of the current, it is necessary that the contact mounting device be water cooled.

While it has been proposed to utilize flexible leads to solve the foregoing problems in instances where the extent of the difficulties was not too severe, there are at the present time no known leads of this type which have the required current carrying capacity and which can be water cooled with any practical arrangement.

Accordingly, we have conceived by our invention an effective solution to the problem presented and have actually constructed a successfully operating and commercially desirable mounting device based upon that concept.

The present invention contemplates the provision of upper and lower, electrically conductive, water cooled blocks having a bushing of a high conductivity metal therebetween which engages a bobbin of another high conductivity metal mounted on the lower block. The upper block is preferably stationary and the lower block supports a contact for engaging the moving work piece. Actually, the lower contact supporting block is movable about the bobbin axis relatively to the upper stationary block and means are provided for resiliently urging the lower block in a direction towards the moving work piece thus to maintain the contact in continuous engagement with the surface of the moving work piece regardless of variations in the smoothness thereof.

In accordance with the present concept, the upper and lower blocks may for example have a pair of silver discs and a sliver bushing therebetween and the bobbin mounted on the lower contact supporting block may be formed of high conductivity copper. This provides a low resistance connection between the blocks and also a wiping contact between members of dissimilar wearing properties. The silver will of course wear faster than the high conductivity copper so that when the surface thereof is worn, it is necessary only to replace the block of simpler construction. Actually, the silver bushing and discs are preferably split in half and opposed upper and lower halves are brazed to the upper and lower blocks, respectively.

As a feature of the invention, a further disc is mounted on the outer face of the bobbin and a take-up screw extends through this disc and into the core of the bobbin so that as the surfaces wear, this disc can be taken up inwardly against the mating silver surface.

The entire problem is further complicated by the fact that, in order to complete the circuit, two such upper and lower block assemblies are required and the blocks for one such mounting assembly must be closely spaced with respect to the blocks for the other such mounting assembly in order to keep the inductance and impedance of the mounting device at a low value. For this reason, the discs or flanges of the bobbins on the facing sides of the blocks are inset in the blocks so that their surfaces are flush with the surfaces of the blocks themselves thereby enabling the blocks of the respective assemblies to be brought into close proximity with one another without interference from these discs; and a disc of insulating material may be mounted on the outside of each of the upper blocks in order to prevent dirt from finding its way on to the contacting surfaces.

As a further feature of the invention, in each of the assemblies, at the rear of the lower block there is provided a generally U-shaped slot which receives a bar having an upwardly extending threaded portion thereon. This bar is fixedly secured to the lower block and the upper block is also provided with a similar U-shaped slot for receiving the upper portion of the bar. The upper portion of the bar has an arcuate slot therein through which passes a bolt encircled by a nylon insulating bushing and mounted in the upper block. This bolt and slot arrangement permits movement of the lower block relatively to the upper block and the bushing insulates the bar from the upper block. Furthermore, the upper portion of the bar is also insulated from the upper block by a thin sheet of nylon which may be U-shaped to conform to the contour of the slot, or which may be in the form of a sleeve. The threaded rod at the upper portion of the rectangular bar supports a tensioning spring thereon which presses at one end against a nylon bushing insulating the spring from the upper block, and against an enlarged head at the top of the threaded rod at the other end thereof. Accordingly, a tensioning arrangement is provided which resiliently urges the lower contact carrying block in a direction to maintain the contact in engagement with the moving work piece while at the same time preventing currents from traversing the bar and passing from the upper to the lower blocks through the bar. In this way, there is no substantial heating of the bar and no arcing is produced between the bar and the upper block.

There has thus been outlined rather broadly the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention, in order to prevent the appropriation of the invention by those skilled in the art.

A special embodiment of the invention has been chosen for purposes of illustration and description, and is shown in the accompanying drawings forming a part of the specification, wherein:

FIG. 1 is a perspective view illustrating the device of the present invention supporting a pair of contacts in engagement with a moving tube for effecting longitudinal welding thereof;

FIG. 2 is a side elevational view, partially broken away, of the apparatus illustrated in FIG. 1; and FIG. 3 is a cross-sectional view taken along the lines 3—3 of FIG. 2.

Referring now to the drawings, and more particularly, to FIGS. 1 and 2 thereof, there is shown a moving work piece 10 which, in the illustrated embodiment, takes the form of a continuous strip of sheet metal formed into a tube with a longitudinal V-shaped gap 11 therein. The edges of the gap are squeezed together at a weld point $w$ by a pair of opposed squeeze rolls 12 and 14. The work piece is continuously fed in the direction indicated by the arrow in FIGS. 1 and 2. A pair of contacts 15 and 16 is shown mounted for engagement with the metal tube on respective sides of the gap 11 therein for supplying radio frequency current to the tube in order to bring the gap edges to welding temperature.

It will be appreciated that, as the work piece is advanced relatively to the contacts 15 and 16, variations in the smoothness or position of the metal surfaces against which the contacts bear would tend to separate the surfaces from the contacts, if the contacts were stationary, thus to permit arcing and damage to the contacts and to the tube.

Each of the contacts is therefore supported by mounting means in accordance with the present concept; but since the mounting means for the respective contacts are similar, only one will be described in detail.

Each contact mounting device comprises a stationary upper block 17 and a movable lower block 19. The upper blocks 17 are connected to transmission members 20 which are insulated from one another as by insulating material 21. These transmission members 20 are connected to a source of high frequency current, as indicated in FIG. 1, and each is bolted to one of the upper blocks 17.

Each block 17 is formed with a semi-circular recessed surface 22 therein (FIGS. 2 and 3) for a purpose to be later described.

Because it is necessary to water cool the blocks and transmission members, the upper block 17 is bored vertically as at 24 and 25, and horizontally as at 26 to form a continuous passage to which water may be conducted through the bore 27 and withdrawn through the bore 29 in the respective transmission member.

Turning now to the lower blocks 19, it will be seen that the contacts 15 and 16 are secured to their respective blocks by means such as bolts 30, for example. A pair of bores 31 and 32 interconnected by a third bore 34 in the contact provides a passage for cooling water conveyed through the lower blocks and their respective contacts through tubes 35 and 36 which are connected by means of a flexible connection such as a length of rubber tubing (not shown) to a water supply.

Each lower block 19 is formed with a semi-circular recessed surface 37 therein of the same radius as the recessed surface 22 in the upper block 17. These two surfaces are so disposed in their respective blocks that when the mounting device is assembled, they are in opposed relation. Shallow semi-circular recesses 39 and 40 are formed on either side of the recessed surface 22 and are concentric therewith, while similar recesses 41 and 42 are formed on the lower block 19.

In the embodiment illustrated, a bushing 44, preferably of silver, is positioned in the bore formed by the opposed recessed surfaces 22 and 37 and centrally apertured silver discs 45 and 46 are placed in the shallow recesses 39 and 40, respectively, of the upper block, and mating recesses 41 and 42, respectively, of the lower block. The central apertures of the discs are equal in diameter to the outside diameter of the bushing 44. As mentioned heretofore, the bushing and discs 45 and 46 are split into halves which are brazed to the upper and lower blocks, respectively.

A spool-shaped bobbin 47 is mounted in the bushing 44 and the annular flanges thereof lie against the discs 45 and 46, as clearly shown in FIG. 3 so that the bushing and disc halves serve as liner means for the bobbin. Actually, the bobbin is made in two pieces, one piece comprising the central cylindrical part and one of the flanges, and the other piece comprising the other flange 48; these pieces being bolted together when assembled as by the bolt 49. The bobbin is secured to the lower block 19 by means of bolts 48′ passing through suitable apertures in the flange 48.

As has been stated, the bobbin and bushing are formed of high conductivity metals of differing wear characteristics so that if silver is used for the bushing 44 and discs 45 and 46, then beryllium copper may be used for the bobbin.

The desirability of spacing the two mounting assemblies closely in order to keep the inductance and impedance of the device at a low value has already been mentioned. For this purpose it will be seen that the recesses 40 and 42 are somewhat deeper than the recesses 39 and 41 so that the outer surface of the bobbin flange seated in the recesses 40 and 42 will be flush with the corresponding surfaces of the blocks 17 and 19, thus enabling the mounting means for the respective contacts to be spaced closely without interference from any part of the bobbin.

The blocks 17 and 19 are provided with corresponding U-shaped slots 50 in which are mounted a stud 51, the lower part of which is rectangular but which has a threaded cylindrical upper portion 52 extending above the top of the block 17. The lower part of the stud 51 is rigidly secured to its respective lower block 19, as by a bolt 54. The upper portion of the stud is formed with an arcuate slot 55 through which passes a bolt 56 mounted in the block 17. This bolt may be encircled with an insulating sleeve or bushing (not shown) as of nylon, for example; and the upper portion of the stud 51 is also encircled by a similar insulating member 57 (FIG. 1) which may take the form of a sleeve or which may be generally U-shaped to conform to the surface of the slot 50.

The upper end of the threaded portion 52 of the stud has an adjustable stop nut 59 mounted thereon and a tension spring 60 bears at one end against the nut 59 and at the other against a rocker bushing 61, which may be formed of nylon and which is forked to receive the upper end of the rectangular portion of the stud 51. The downwardly projecting tangs 62 thus formed in the bushing are curved as shown, and bear against the upper surface of the stationary upper block 17.

In operation, radio frequency current is supplied from a suitable source as indicated in FIG. 1 and both mounting assemblies are cooled by a flow of water through the respective pipes 27, 29 and 35, 36 in the upper and lower blocks. As the work piece 10 is advanced, the inherent unevenness and variations in smoothness in the surface thereof adjacent the edges of the gap 11 will cause the lower blocks 19 to rock about the axis of the bobbin 47 under the force of the tension springs 60 acting between the stud 51 and the nylon bushings 61 to maintain the contacts in continuous engagement with their respective work piece surfaces. For this purpose, a maximum excursion of between approximately ¼ to ⅜ inch is deemed to be adequate. As rocking occurs, the studs 51 which are rigidly fixed to the lower blocks 19 will also rock relatively to the upper blocks 17, such movement being permitted by the coaction of the arcuate slots 55 in the studs and the bolts 56 passing therethrough, the curved tangs 62 of the bushings 61 enabling the same to rock on the upper surfaces of the blocks 17.

Actually, since the bobbin is affixed to the lower blocks, it too rocks about its own axis so that the wear surfaces are between the center portion thereof and the upper part of the bushing 44 and between the upper half of the bobbin flanges and the upper half of the discs 45 and 46.

It will be seen that the flange 48 of the two piece bobbin may be tightened down by the bolt 49 as wear of the discs occurs. Also it is a simple matter to disassemble the blocks from one another and replace the entire upper block when the need arises, this block being of simplest construction.

An arcuate disc 64 of insulating material is mounted as by screws 65 on the outer surface of each of the upper blocks and serves to protect the wiping surfaces from dust.

From the foregoing description, it will be seen that the present invention provides a water-cooled contact mounting device for continuously supplying radio frequency current to a moving work piece in spite of the variations in smoothness and unevenness of the two surface regions against which the contacts bear, and that the greatest wear will occur in those parts of the device which may be replaced most quickly and easily.

The construction and operation of our novel mounting device will now be understood, and the advantages thereof will be fully appreciated by those persons skilled in the art.

We now claim:

1. A contact mounting device of the class described comprising, a stationary member, a movable member, said members having opposed complementary surfaces, pivot electrically conductive means between said surfaces including lining means engaging said surfaces, a bobbin seated in said lining means and secured to said movable member, said pivot means thus establishing an electrical connection between said members, said pivot means having a pivot axis about which it is adapted to rock together with said movable member secured thereto relatively to said stationary member, electrical contact means carried by said movable member, and resilient means urging said movable member to pivot about said axis in a direction to move said contact means towards a work piece.

2. A contact mounting device according to claim 1, further characterized by the formation of said complementary surfaces to include recesses in the sides of said members, elements of like material as said lining means seated in said recesses adjacent said lining means, and flanges on said bobbin engaging the exterior faces of said elements.

3. A contact mounting device according to claim 2, further characterized in that one of said flanges is adjustable axially.

4. A contact mounting device according to claim 2, further characterized in that a shield is mounted on one of said members to protect the wiping surfaces of said bobbin and lining means from the ingress of foreign matter.

5. A contact mounting device according to claim 2, further characterized in that one of said recesses is so related to its respective element and bobbin flange seated therein that said flange presents an outer surface flush with the corresponding surfaces of said stationary and movable member.

6. A contact mounting device of the class described comprising, a stationary member, a movable member, said members having opposed complementary surfaces, lining means engaging said surfaces, a bobbin seated in said lining means for wiping contact therewith and being secured to said movable member, said lining means and bobbin being formed of materials of high electrical conductivity and said bobbin having greater wear strength than said lining means, said bobbin providing a pivot axis about which it is adapted to rock together with said movable member relatively to said stationary member, electrical contact means carried by said movable member, and resilient means urging said movable member to pivot about said axis in a direction to move said contact means towards a work piece.

7. A contact mounting device of the class described comprising a pair of assemblies, each including: a stationary member, a movable member, said members of each assembly respectively having opposed complementary surfaces, lining means engaging said surfaces in each such assembly, a bobbin seated in each such lining means for wiping contact therewith and being secured to its respective movable member, said lining means and bobbins being formed of materials of high electrical conductivity and said bobbins having greater wear strength than said lining means, said bobbins providing a pivot axis about which they are adapted to rock together with said movable members relatively to said stationary members, electrical contact means carried by said movable members, and resilient means urging said movable members to pivot about said axes in a direction to move said contact means towards a work piece.

8. A contact mounting device of the class described comprising a pair of assemblies each including: a stationary member, a movable member, said members of each assembly respectively having opposed complementary surfaces, electrically conductive pivot means between said surfaces in said respective assemblies and each including a bushing engaging said surfaces and a bobbin seated in each bushing and secured to said movable members, respectively, said pivot means thus establishing an electrical connection between said respective upper and lower members, said pivot means having a pivot axis about which its respective bobbin is adapted to rock relatively to its corresponding stationary member and together with said movable member respectively secured thereto, electrical contact means carried by said movable members, and resilient means urging said movable members to pivot about said axes in a direction to move said contact means towards a work piece.

9. A contact mounting device according to claim 7, further characterized by the formation of said complementary surfaces to include recesses in the sides of said members, discs of like material as said lining means seated in said recesses adjacent said lining means and flanges on said bobbins engaging the exterior faces of said discs, respectively.

10. A contact mounting device according to claim 9, further characterized in that one of said recesses in each assembly is so related to its respective disc and bobbin flange seated therein that said flange presents an outer surface flush with its respective corresponding surfaces of said stationary and movable members, said flush surfaces being closely spaced from and facing one another.

11. A contact mounting device of the class described, comprising, a stationary member, a movable member, said members having opposed, complementary recessed surfaces and having relatively shallow complementary recesses in the sides thereof concentric with said recessed surfaces, liners for said recessed surfaces secured to said respective members, lining members seated in said relatively shallow recesses and secured to the respective members, flanged bobbin means seated between said liners with its flanges in said relatively shallow recesses contacting said lining members thus to provide wiping contact between said bobbin means and said liner and lining members secured to said stationary member, said bobbin being removably secured to said movable member, said liners, lining members and bobbin means being formed of materials of high electrical conductivity and said bobbin means having greater wear strength than said liners and lining members, said bobbin providing a pivot axis about which it is adapted to rock together with said movable member relatively to said stationary member, one of said bobbin flanges being so related to its respective lining member and recess as to present an outer surface flush with the corresponding surfaces of said members, an electrical contact carried by said movable member, passageways in said movable member and said contact for conducting cooling fluid therethrough, a passageway through said stationary member for conducting cooling fluid therethrough, a stud secured to said movable member and passing through said stationary member, spring means extending between a head on said stud and said stationary member to urge said contact on said movable member towards a work piece, means insulating said stud from said stationary member, and means connecting said stationary member to a source of high frequency electrical current.

12. Contact mounting means according to claim 11, wherein two such assemblies are disposed in closely spaced relation, each constituting a part of a high frequency electrical circuit wherefore the inductance and impedance of the circuit are maintained at a low value.

13. A contact mounting device of the class described comprising, a stationary electrically conductive member, a movable electrically conductive member, said members having opposed complementary seating surfaces, electrically conductive pivot means positioned between said surfaces including a bobbin secured to one of said members, said pivot means having a pivot axis passing between said stationary and movable members, electrical contact means carried by said movable member, and resilient means urging said movable member to pivot about said axis in a direction to move said contact means towards a work piece.

14. A contact mounting device of the class described comprising, a stationary electrically conductive member, a movable electrically conductive member, said members having opposed face to face complementary recessed seating surfaces, electrically conductive pivot means positioned in seating engagement with said surfaces and secured to one of said members, said pivot means having a pivot axis extending between said stationary and movable members, electrical contact means carried by said movable member, and resilient means urging said movable member to pivot about said axis in a direction to move said contact means towards a work piece.

References Cited in the file of this patent
UNITED STATES PATENTS

| | | |
|---|---|---|
| 1,874,399 | White | Aug. 30, 1932 |
| 1,998,139 | Kurtze | Apr. 16, 1935 |
| 2,005,912 | Drake | June 25, 1935 |
| 2,857,503 | Rudd et al. | Oct. 21, 1958 |
| 2,992,318 | La Tour et al. | July 11, 1961 |